(12) United States Patent
Lee et al.

(10) Patent No.: US 7,444,172 B1
(45) Date of Patent: Oct. 28, 2008

(54) DEVICE AND METHOD FOR CONTROLLING RADIO MOBILE TERMINAL CONNECTED TO HANDS-FREE KIT

(75) Inventors: Dong-Jin Lee, Suwon-shi (KR); Byung-Hun Hwang, Suwon-shi (KR); Chul-Gyoo Park, Yongin-shi (KR); Young-Seoung Joo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/457,817

(22) Filed: Dec. 9, 1999

(30) Foreign Application Priority Data

Dec. 9, 1998 (KR) .............................. 1998-53952

(51) Int. Cl.
*H04Q 7/20* (2006.01)
(52) U.S. Cl. .................. 455/569; 455/567; 455/573
(58) Field of Classification Search .............. 455/569, 455/90, 567, 575, 572, 573, 345
See application file for complete search history.

(56) References Cited

U.S. PATENT DOCUMENTS

| 5,367,556 | A | * | 11/1994 | Marui | 379/58 |
| 5,802,167 | A | * | 9/1998 | Hong | 379/388 |
| 5,812,954 | A | * | 9/1998 | Henriksson | 455/550 |
| 5,864,766 | A | * | 1/1999 | Chiang | 455/572 |
| 5,898,908 | A | * | 4/1999 | Griffin | 455/127 |
| 6,173,195 | B1 | * | 1/2001 | Chen | 455/567 |
| 6,314,307 | B1 | * | 11/2001 | Charron | 455/573 |

* cited by examiner

*Primary Examiner*—Daniel Hunter
*Assistant Examiner*—Khawar Iqbal
(74) *Attorney, Agent, or Firm*—The Farrell Law Firm, P.C.

(57) ABSTRACT

A device and method for automatically controlling power of a radio mobile terminal connected to a hands-free kit and for preventing the radio mobile terminal from malfunctioning. In a power control method for automatically turning on a radio mobile terminal connected to a hands-free kit, the radio mobile terminal including a power control signal generator, a signal output terminal and a signal input terminal, the hands-free kit including a power-on signal generator and a signal detector, a power-on signal is supplied to the signal input terminal for a predetermined time period through the power-on signal generator when the radio mobile terminal is connected to the hands-free kit. After the predetermined time period elapses, generating the power-on signal is stopped. It is determined if the driving signal generated by the signal output terminal is detected through the signal detector. If the driving signal is detected, generating the power-on signal is stopped.

5 Claims, 4 Drawing Sheets

DEVICE AND METHOD FOR CONTROLLING RADIO MOBILE TERMINAL CONNECTED TO HANDS-FREE KIT

PRIORITY

This application claims priority to an application entitled "Device and Method for Controlling Radio Mobile Terminal Connected to Hands-Free Kit" filed in the Korean Industrial Property Office on Dec. 9, 1998 and assigned Serial No. 98-53952, the contents of which are hereby incorporated by reference.

BACKGROUND OF THE INVENTION

1. Field of the Invention

The present invention relates to power control for a radio mobile terminal connected to a hands-free kit, and in particular, to a device and method for automatically controlling power of a radio mobile terminal connected to a hands-free kit and for preventing the radio mobile terminal from malfunctioning.

2. Description of the Related Art

Typically, a hands-free kit for a radio mobile terminal is mounted in a vehicle to allow convenient, hands-free use of the radio mobile terminal. However, if the radio mobile terminal has its power switched off when connected to the hands-free kit, a user must turn on the power of the radio mobile terminal in addition to connecting the terminal to the hands-free kit. Also, if the radio mobile terminal's battery is completely discharged when connected to the hands-free kit, the user must turn on the power by pressing a power key on a keypad of the radio mobile terminal prior to making a call. Moreover, during a call, if a signal generated by the hands-free kit is applied to a signal input terminal which is connected to the power key on the key pad of the radio mobile terminal to receive a power-on or power-off signal, a communication path is cut off, ending the call.

SUMMARY OF THE INVENTION

It is, therefore, an object of the present invention to provide a device and method for automatically switching on power of a radio mobile terminal connected to a hands-free kit.

It is another object of the present invention to provide a device for preventing malfunction of a radio mobile terminal, which may be generated during a call as a voltage of a hands-free kit is applied to a signal input terminal of the radio mobile terminal.

To achieve these and other objects of the present invention, there is provided a power control device for automatically turning on power of a radio mobile terminal connected to a hands-free kit, including a power control signal generator in the radio mobile terminal for generating a power control signal to supply power to the radio mobile terminal, a signal output terminal connected to the power control signal generator, for generating a driving signal to enable the power control signal generator, and a signal input terminal connected to a power key of the radio mobile terminal, for receiving a power-on signal; and the hands-free kit including a power-on signal generator connected through a connector between the power key and the signal input terminal, for generating the power-on signal, a signal detector connected through the connector between the signal output terminal and the power control signal generator, for detecting the driving signal generated by the signal output terminal, and a controller for controlling the power-on signal generator to generate the power-on signal depending on whether the driving signal generated by the signal output terminal is detected through the signal detector.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described hereinbelow with reference to the accompanying drawings. In the following description, numerous specific details are set forth to provide a more thorough understanding of the present invention. It will be apparent, however, to one skilled in the art the present invention may be practiced without these specific details. In other instances, well-known functions or constructions are not described in detail since they would obscure the invention in unnecessary detail.

Generally, a hands-free kit is connected to a radio mobile terminal through a curl cord or connector. Within the curl cord, lines RX-AUDIO, TX-AUDIO, DC-GROUND, CF (Current Feedback), and HP-POWER are connected to the radio mobile terminal. In the present invention, the HP-POWER line is used for power control.

Figure 1:
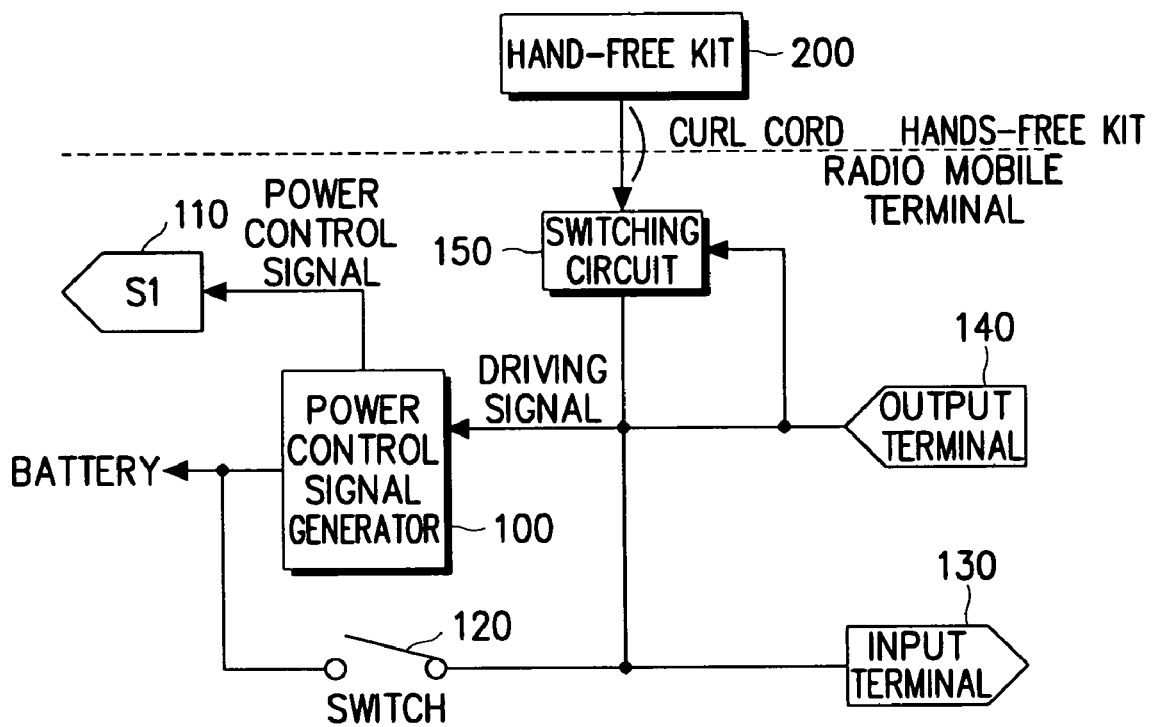
FIG. 1 is a schematic block diagram illustrating a power control device for preventing a radio mobile terminal connected to a hands-free kit from malfunctioning during a call in accordance with an embodiment of the present invention.

FIG. 1 illustrates a power control circuit for preventing a radio mobile terminal from malfunctioning when the radio mobile terminal is connected to a hands-free kit while making a call.

Referring to FIG. 1, a power control signal generator 100 generates a power control signal to supply power to the radio mobile terminal. A signal output terminal 140 is connected to the power control signal generator 100 and generates a driving signal for enabling the power control signal generator 100. A signal input terminal 130 is connected to a switch 120 on a keypad of the radio mobile terminal and receives a power on/off signal. A switching circuit 150 has an input terminal connected to a terminal for connecting the hands-free kit and has an output terminal connected between the signal output terminal 140 and the power control signal generator 100 and between the switch 120 and the signal input terminal 130. The switching circuit 150 is enabled or disabled by the driving signal provided from the signal output terminal 140. A controller (not shown) controls the signal output terminal 140 to generate the driving signal according to a signal applied to the signal input terminal 130.

Typically, the radio mobile terminal uses a dual purpose key having two functions, one being power control, in order to reduce the area occupied by the keypad. For instance, the radio mobile terminal shares a power key on the keypad with a communication path cutoff key. If the user presses an END/

POWER key on the keypad for a long time, the switch 120 turns on/off the power. If the user presses the END/POWER key during a call, the switch 120 ends the call. The signal generated through the switch 120 is applied to the signal input terminal 130 in the controller (not shown) to turn the power on or off or to end a call. If the signal generated through the switch 120 is a power on signal, the driving signal is generated through the signal output terminal. The driving signal is applied to the power control signal generator 100 to cause the power control signal generator 100 to operate. The power control signal generator 100 provides the power control signal to a power supply (not shown) so as to supply the power to the radio mobile terminal.

In the prior art, if the radio mobile terminal is connected to the hands-free kit while making a call, the HP-POWER line of the hands-free kit is connected between the signal output terminal 140 and the power control signal generator 100 and between the switch 120 and the signal input terminal 130. Then a signal of the HP-POWER line is applied to the signal input terminal 130 and the communication path is cut off, ending the call.

In the present invention, however, the switching circuit 150 prevents such a malfunction. The switching circuit 150 is enabled or disabled by the driving signal provided from the signal output terminal 140. When disabled, the switching circuit 150 prevents the signal generated by the hands-free kit 200 from being switched to the radio mobile terminal.

Figure 2:
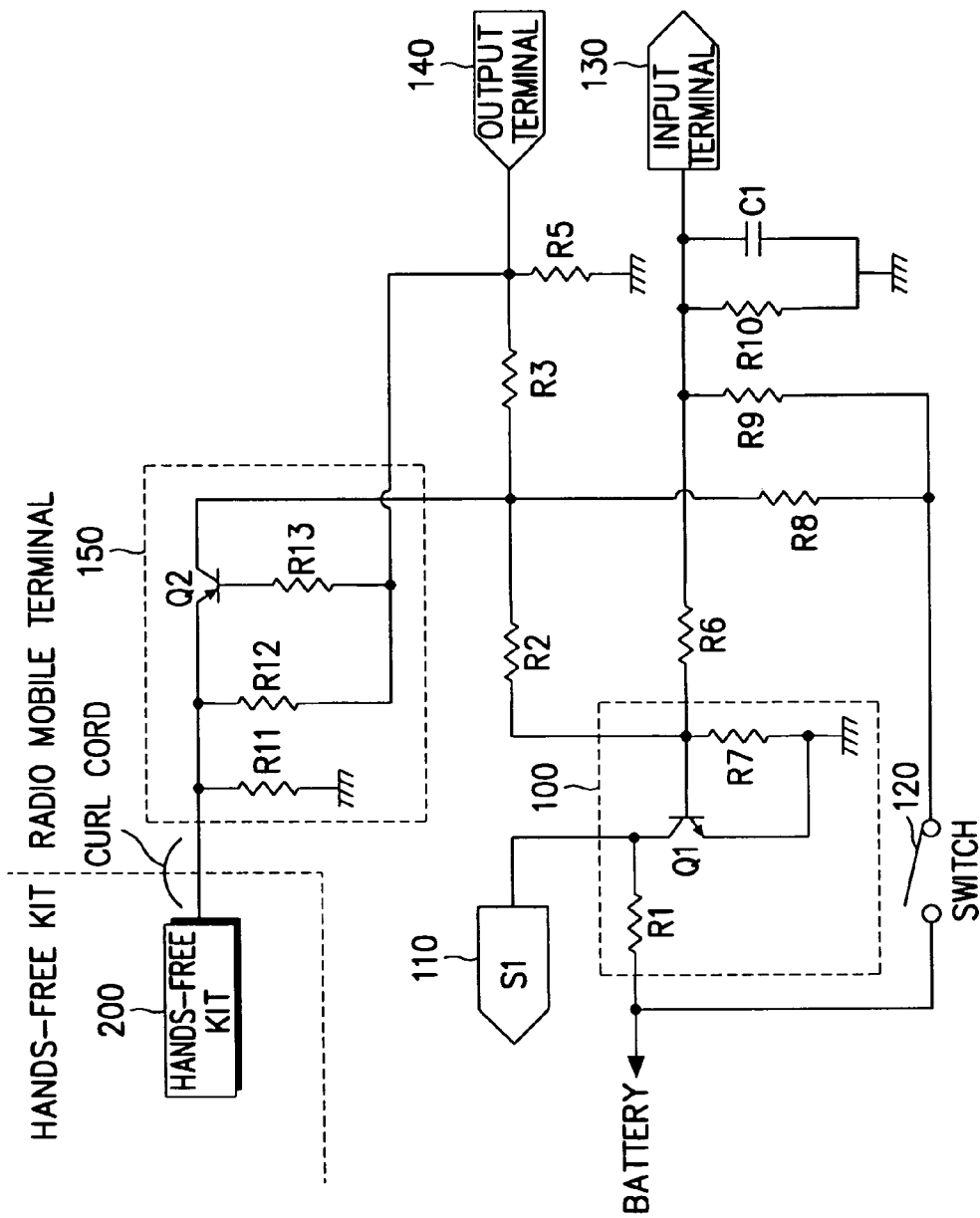
FIG. 2 is a circuit diagram illustrating the power control device of FIG. 1.

FIG. 2 is a detailed circuit diagram of the power control device of FIG. 1. An NPN transistor Q1 is used in the power control signal generator 100. The switching circuit 150 includes a first resistor R11 interposed between a terminal for connecting the hands-free kit 200 and ground. The switching circuit 150 also includes a second resistor R12 interposed between the hands-free kit terminal and the signal output terminal 140, and includes a PNP transistor Q2 having an emitter connected to the hands-free kit terminal and a collector connected between the signal output terminal 140 and the power control signal generator 100. The switching circuit 150 further includes a third resistor R13 interposed between a base of the transistor Q2 and output terminal 140.

If the signal output terminal 140 is logic "high", that is, if the driving signal is generated, the transistor Q2 is turned off and thus the signal applied to the HP-POWER line is cut off. Since the radio mobile terminal is switched on during a call, the driving signal for controlling the power of the radio mobile terminal becomes logic "high".

Figure 3:
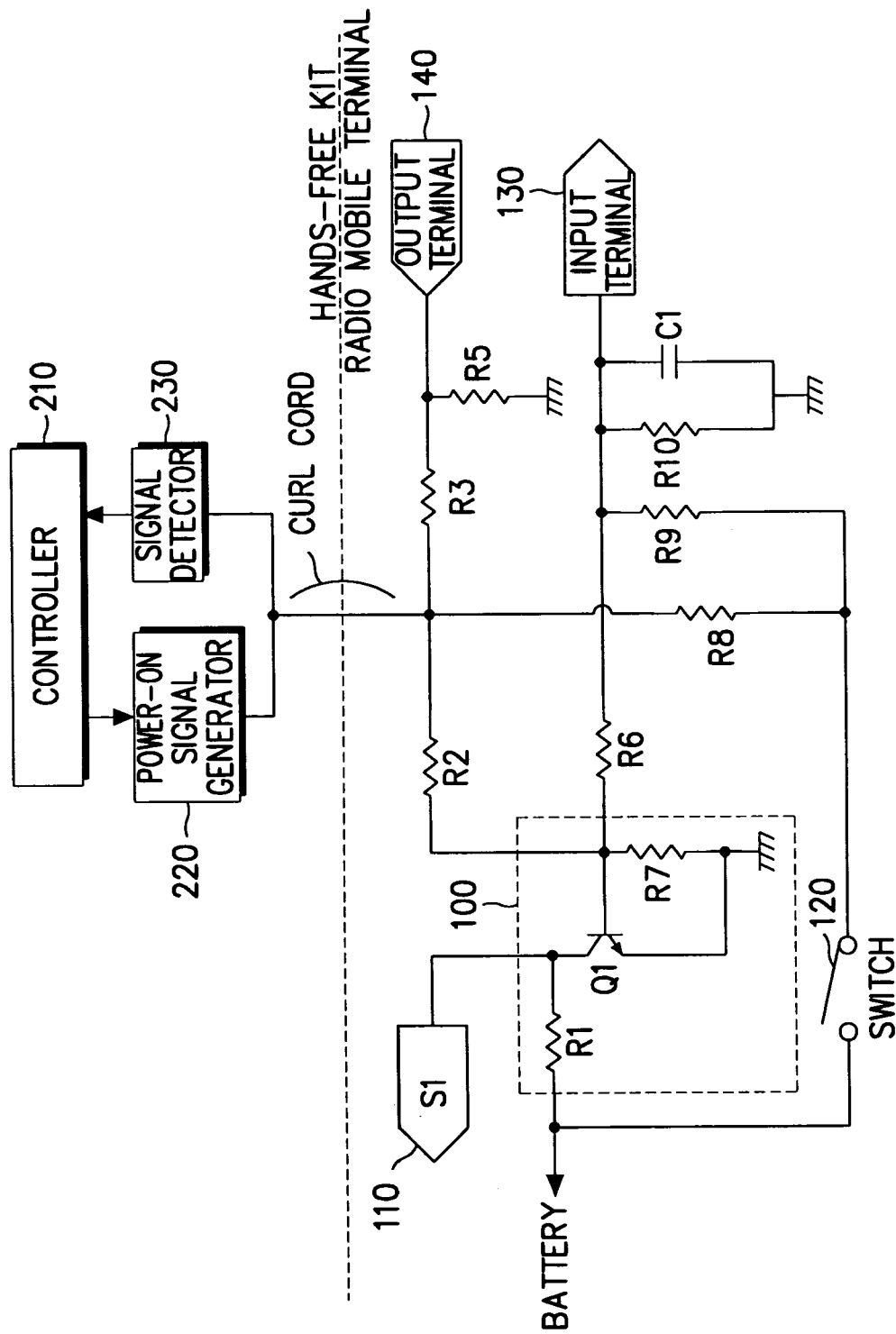
FIG. 3 is a circuit diagram illustrating a power control device for controlling power of a radio mobile terminal connected to a hands-free kit in accordance with another embodiment of the present invention.

FIG. 3 illustrates a power control device for controlling the power of a radio mobile terminal connected to a hands-free kit according to another embodiment of the present invention.

Referring to FIG. 3, the radio mobile terminal includes a power control signal generator 100 for generating a power control signal to supply power to the radio mobile terminal. A signal output terminal 140 is connected to the power control signal generator 100 and generates a driving signal for enabling the power control signal generator 100. A signal input terminal 130 is connected to a switch 120 (power key) and receives a power-on signal. The hands-free kit includes a power-on signal generator 220 connected through a connector (curl cord) between the switch 120 and the signal input terminal 130 to generate the power-on signal. The hands-free kit also includes a signal detector 230 connected through the connector between the signal output terminal 140 and the power control signal generator 100 to detect the driving signal provided from the signal output terminal 140. The hands-free kit further includes a controller 210 for controlling the power-on signal generator 220 to generate the power-on signal depending on whether the driving signal generated by the signal output terminal 140 is detected through the signal detector 230.

Figure 4:
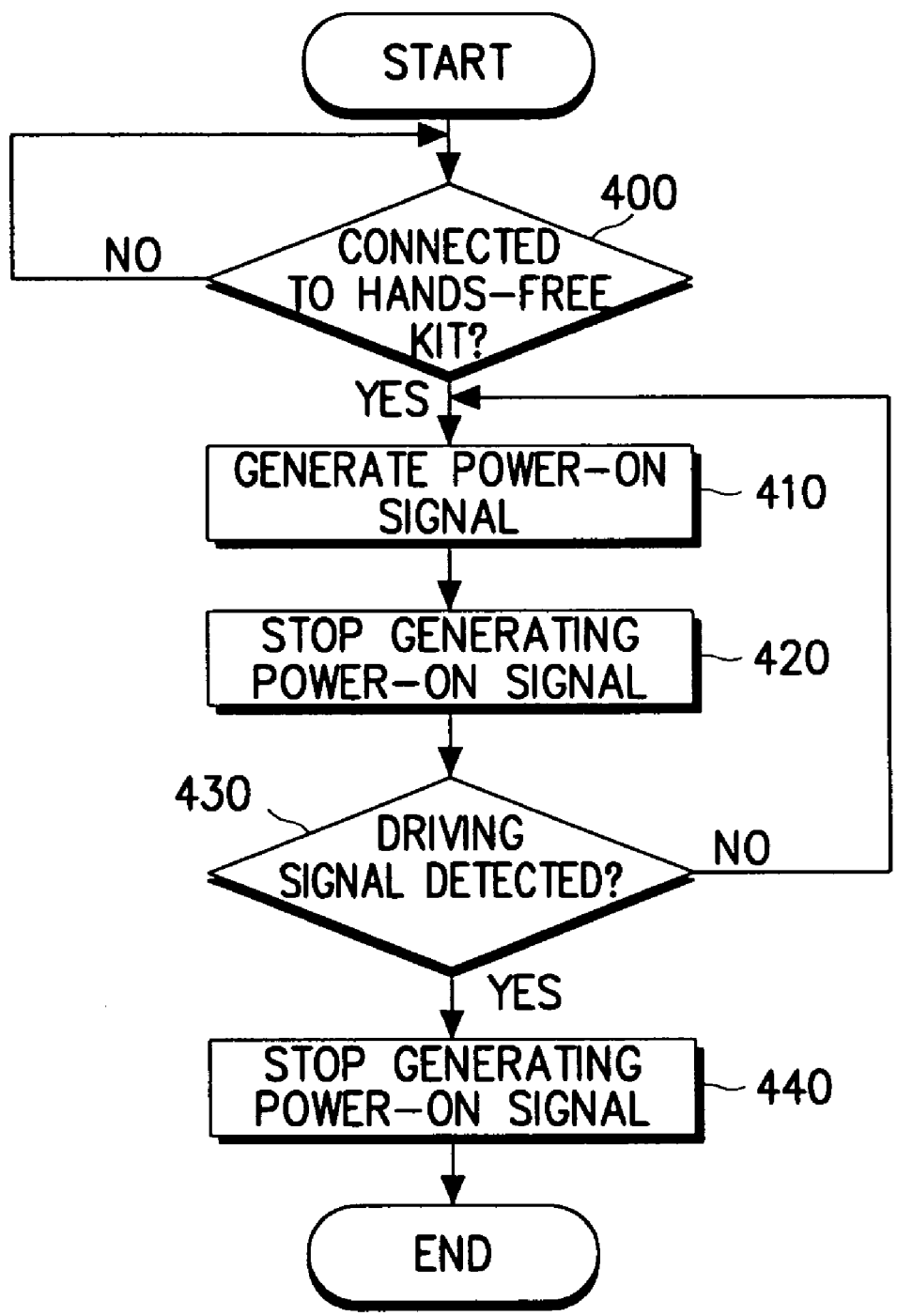
FIG. 4 is a flow chart illustrating the operation of the power control device of FIG. 3.

FIG. 4 is a flow chart illustrating the operation of the power control device of FIG. 3.

Referring to FIG. 4, the controller 210 of the hands-free kit determines if the radio mobile terminal is connected to the hands-free kit at step 400, by sensing whether two DC-ground terminals of the hands-free kit are shorted by the radio mobile terminal. If the radio mobile terminal is connected to the hands-free kit, the controller 210 directs the power-on signal generator 220 to generate the power-on signal for a predetermined time period (about 300 ms) at step 410. The power-on signal is the same as the signal generated through the switch 120 to drive the power control signal generator 100. The controller 210 directs the power-on signal generator 220 to stop generating the power-on signal at step 420. The controller 210 then checks through the signal detector 230 whether the driving signal is generated by the signal output terminal 140 at step 430. The power-on signal generated through step 410 is then applied to the signal input terminal 130 and a controller (not shown) of the radio mobile terminal detects the power-on signal as a power-on command. Typically, if the switch 120 is pressed for a prescribed time period, the power is switched on. Similarly, if the power-on signal is applied to the signal input terminal 130 for a prescribed time period, the controller of the radio mobile terminal determines that the power-on command is received. The controller of the radio mobile terminal then directs the signal output terminal 140 to generate the driving signal. If the power of the radio mobile terminal is switched on, the signal output terminal 140 generates a logic "high" signal (i.e., driving signal) and the radio mobile terminal is maintained at a power-on state. It can be determined whether the radio mobile terminal is switched on by detecting the driving signal with the signal detector 230. If the radio mobile terminal is in a power-on state, the controller 210 directs the power-on signal 220 to stop generating the power-on signal at step 440. If the radio mobile terminal is not in a power-on state at step 430, when no driving signal is detected, the controller 210 returns to step 410.

In the second embodiment of the present invention described with reference to FIGS. 3 and 4, the controller 210, power-on signal generator 220 and signal detector 230 may be comprised of a single chip, and the signal detector 230 may be connected to a GPIO (General Purpose Input Output) port of the chip.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A power control device for automatically turning on power to a radio mobile terminal connected to a hands-free kit, comprising:

a circuit in said radio mobile terminal comprising a power control signal generator for generating a power control signal to supply power to said radio mobile terminal, a signal output terminal connected to said power control signal generator, for generating a driving signal to enable said power control signal generator, and a signal input terminal connected to a power key of said radio mobile terminal, for receiving a power-on signal; and a circuit in said hands-free kit comprising a power-on signal generator connected between said power key and said signal input terminal, for generating said power-on signal, a signal detector connected between said signal output terminal and said power control signal generator, for detecting said driving signal generated by said signal output terminal, and a controller for controlling said power-on signal generator to generate said power-on signal depending on whether said driving signal generated by said signal output terminal is detected through said signal detector.

2. A power control method for automatically turning on power to a radio mobile terminal connected to a hands-free kit, a circuit in said radio mobile terminal including a power control signal generator for generating a power control signal to supply power to said radio mobile terminal, a signal output terminal for generating a driving signal to enable said power control signal generator, and a signal input terminal connected to a power key of said radio mobile terminal, for receiving a power-on signal, and circuit in said hands-free kit including a power-on signal generator connected between said power key and said signal input terminal, for generating said power-on signal, and a signal detector connected between said signal output terminal and said power control signal generator, for detecting said driving signal generated by said signal output terminal, said method comprising the steps of:

supplying said power-on signal to said signal input terminal for a predetermined time period through said power-on signal generator when said radio mobile terminal is connected to said hands-free kit;

determining if said driving signal generated by said signal output terminal is detected through said signal detector; and terminating said power-on signal upon detection of said driving signal.

3. The power control method as claimed in claim 2, further comprising the step of returning to said step of supplying said power-on signal if said driving signal is not detected.

4. A power control device for preventing malfunction of a radio mobile terminal connected to a hands-free kit during a call, comprising:

a power control signal generator for generating a power control signal to supply power to said radio mobile terminal;

a signal output terminal connected to said power control signal generator, for generating a driving signal to enable said power control signal generator;

a signal input terminal connected to a power key on a key pad of said radio mobile terminal, for receiving a power on/off signal;

a switching circuit having an input terminal connected to said hands-free kit and having an output terminal connected between said signal output terminal and said power control signal generator and between said power key and said signal input terminal, wherein said switching circuit is enabled or disabled according to said driving signal provided from said signal output terminal; and a controller for controlling said signal output terminal to generate said driving signal according to said power on/off signal applied to said signal input terminal.

5. The power control device as claimed in claim 4, wherein said switching circuit includes:

a first resistor interposed between said hands-free kit and ground;

a second resistor interposed between said hands-free kit and said signal output terminal;

a PNP transistor having an emitter connected to the hands-free kit and a collector connected between said signal output terminal and said power control signal generator; and a third resistor interposed between a base of said PNP transistor and said signal output terminal.

\* \* \* \* \*